April 28, 1970            R. GENIN            3,508,350

TIME TONE CLOCK

Filed April 4, 1967            2 Sheets-Sheet 1

INVENTOR.
ROBERT GENIN
BY *Michael Ebel*
ATTORNEY

April 28, 1970 R. GENIN 3,508,350
TIME TONE CLOCK

Filed April 4, 1967 2 Sheets-Sheet 2

INVENTOR.
ROBERT GENIN
BY
ATTORNEY

:::::::::::::::::::::::::::::::::::::::::::::::::::::::::::::::::

United States Patent Office 3,508,350
Patented Apr. 28, 1970

3,508,350
TIME TONE CLOCK
Robert Genin, Scarsdale, N.Y., assignor to Child Guidance Toys Inc., Bronx, N.Y., a corporation of New York
Filed Apr. 4, 1967, Ser. No. 628,339
Int. Cl. G09b 17/00
U.S. Cl. 35—39                              3 Claims

ABSTRACT OF THE DISCLOSURE

A toy clock to teach how to tell time, the clock including a gear works formed of transparent elements and operated by a crank to drive the hands of the clock which turn on a window through which the works are visible, the gear works also serving to actuate sound-producing elements which mark the passage of time.

---

This invention relates generally to a device adapted to teach a child to tell time, and more particularly to a manually-operated educational clock having an exposed gear-works wherein the gears not only serve to operate time-indicating hands, but also to strike sound-producing elements to mark the passage of time.

Time measurement is so important in many phases of human activity that in elementary education it becomes essential that a youngster be able to tell time even before he has learned to read and write. It is difficult for an adult to appreciate the problems encountered by many children in telling time, for the adult has long since ceased to question the nature of time measurement.

In the distance past, man discovered that the prime requisite for time measurement is some process transpiring at a uniform rate. Water clocks and hourglasses are based essentially on the flow of a known volume of a homogeneous substance through an opening. Thus a child observing a water clock or an hourglass, senses the passage of time in terms of visible flow. But with a modern mechanical clock where only the hands are exposed, the child is unable to relate the passage of time to a meaningful process. Moreover, the division of time into minute and hour increments involves a concept that is not easy to grasp.

Accordingly, it is the primary object of this invention to provide a manually-operated device adapted to teach a child to tell time, the device being both instructive and enjoyable, for in the course of playing with the device the child learns to tell time without conscious effort.

More specifically, it is an object of the invention to provide a toy device having an exposed gear train and a working mechanism manually operated by a child and serving to drive the hands of a clock, so that the function of the basic clock mechanism becomes understandable and the manner in which rotary motion is converted into time indicia is made evident.

Also an object of the invention is to provide a device of the above type which marks the passage of time with distinctive sounds, so that the child can readily understand the distinction between minutes, hours and other time increments.

Still another object of the invention is to provide a clock whose gear works are formed of transparent elements which are visible through transparent windows in a casing whereby light is able to pass through said casing and through said elements to illuminate the working mechanism of the clock.

Yet another object of the invention is to provide an educational clock of sturdy construction which can withstand rough handling, which operates reliably and yet is highly decorative.

Briefly stated, these objects are attained in a device in which a gear train whose elements are formed of transparent synthetic plastic material is housed within a casing having a transparent window, and is operated manually by a crank, the gears being operatively coupled to hour and minute hands which turn with respect to a time scale, the arrangement being such that for each full revolution of the minute hand, the hour hand is displaced by one-hour increment on the scale, the gear train also operating sound-producing elements to tick off the passage of minutes and to strike a gong which rings out the hours, as well as to hit a chime at quarter-hour intervals.

For a better understanding of the invention as well as other objects and further features thereof, reference is made to the following detailed description to be read in conjunction with the accompanying drawing wherein.

Figure 3:
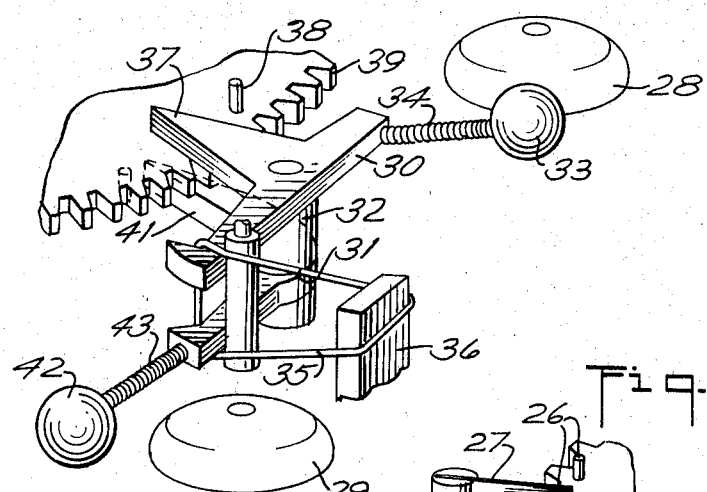
Figure 4:
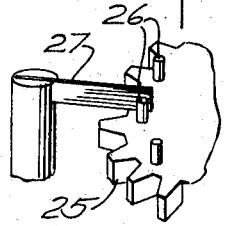

FIG. 3, in perspective, separately shows the gongs for the hours and quarter-hours and the associated actuating mechanism; and FIG. 4 is a perspective view of the minute ticker.

Figure 1:
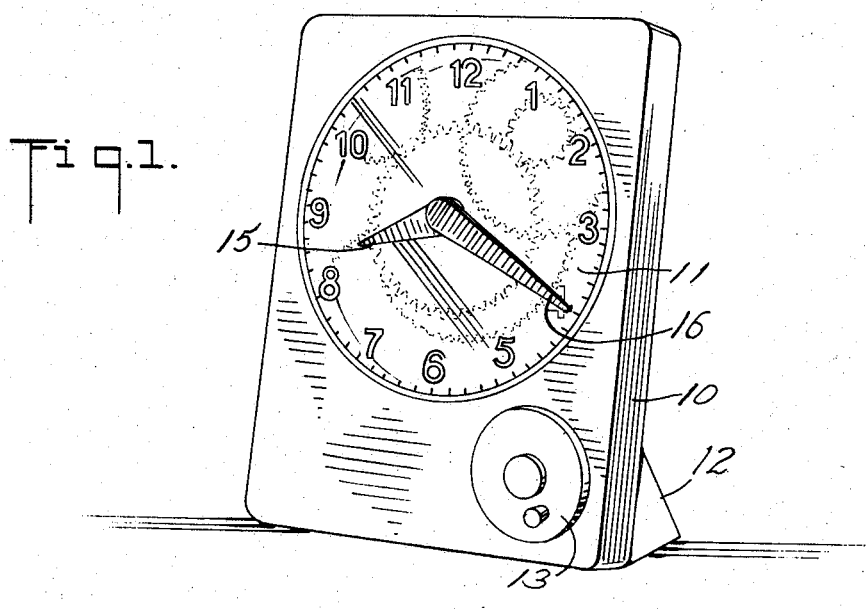
FIG. 1 is a perspective view of an educational clock in accordance with the invention.

Referring now to FIG. 1, there is shown an educational clock in accordance with the invention, the clock being housed in a generally rectangular casing 10, formed of a suitable synthetic plastic material which is effectively unbreakable, such as high-impact polyethylene or nylon. The front and rear panels of the casing are provided at corresponding positions with large circular windows which are transparent, the front window being designated by numeral 11. An easel 12 or other means is provided for the table-top display of the clock. For wall mounting, keyhole slots may be formed in the rear wall.

Figure 2:
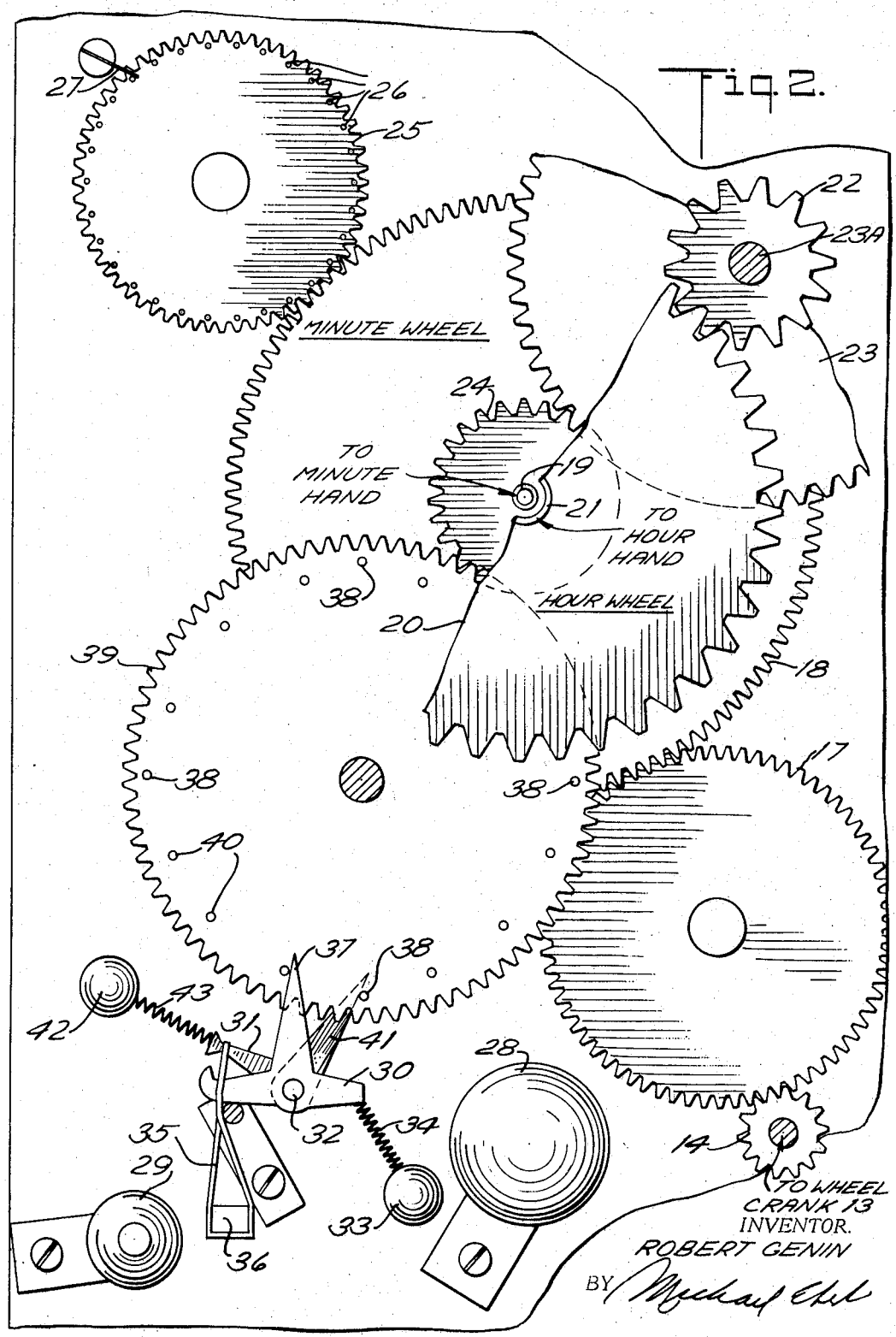
FIG. 2 is an elevational view showing the gear works in the interior of the clock and the sound-producing elements cooperating therewith.

Printed on the interior surface of window 11 is a circular time scale having numbers 1 to 12 for the hours of the day and sixty radial lines, for the minutes. Supported within the casing and visible through the windows is a gear train operated manually by a crank wheel 13 which lies within a circular well on the front panel of the casing. The crank wheel is coupled to a pinion 14 within the casing which acts as the first wheel in the train, (FIG. 2). The gear train drives an hour hand 15 and a minute hand 16, such that for each full revolution of the minute hand, the hour hand moves an hour increment, that is to say 30 degrees which is one-twelfth of the circular scale.

The manner in which this is accomplished will now be explained in connection with FIG. 2. Pinion 14, which is turned by wheel crank 13, engages an idler gear 17 intermeshing with a minute wheel 18 which is connected by a shaft 19 to the minute hand. Shaft 19 is at the center of the circular time scale. An hour wheel 20 is coupled to a hollow shaft 21 connected to the hour hand, shaft 19 being concentrically disposed within hollow shaft 21.

Hour wheel 20 is driven by a pinion 22 keyed to the shaft 23A of idler wheel 23 which intermeshes with a pinion 24 keyed to the shaft 19 of the minute wheel 18. Thus as minute wheel 18 is caused to turn by idler gear 17, its motion is transmitted through the train of gears 24, 23 and 22, to hour wheel 20, the gear ratio being such as to cause the hour wheel to move 30 degrees for each full revolution made by the minute wheel.

In order to produce the sound of a tick a minute as the clock is manually operated, an auxiliary gear 25 is provided which intermeshes with minute wheel 18 and which has a series of equispaced pins 26 mounted thereon, the pins projecting laterally from the face of the auxiliary gear. Extending into the path of pins 26 is a flexible reed 27 projecting from a fixed post, the reed being successively engaged by the advancing pins to produce a loud ticking sound for each minute.

In order to produce distinctive gong sounds marking the hours and quarter-hours, two gongs 28 and 29 of different size are provided, the larger gong 28 being for hour intervals and having a relatively deep tone compared to that produced by the smaller gong 29. The smaller gong may be replaced by a chime to give an even more distinctive sound.

To strike these gongs at the proper time intervals, two rockers 30 and 31 are provided, mounted on a common shaft 32. Rocker 30 has a ball hammer 33 attached by a helical spring 34 to one arm thereof, hammer 33 being positioned to strike gong 28 when the rocker is actuated. The opposing arm of rocker 30 is restrained by a rubber band 35 encircling a post 36, so that the hammer is normally withdrawn from the gong. A triangular projection 37 on rocker 30 is positioned to be engaged by a succession of four pins 38 projecting from one face of an auxiliary gear 39 which intermeshes with the pinion 24 keyed to shaft 19 of the minute wheel.

The four pins 38 are positioned 90 degrees apart on auxiliary gear 39, which gear moves one quadrant for each full revolution of the minute wheel, thereby causing a pin 38 at each hour interval to actuate the rocker 30 to strike gong 28.

On the opposing face of auxiliary gear 39, four sets of laterally projecting pins 40 are provided, each set consisting of three pins which are equi-spaced along an arc corresponding to an arc extending between the pins 38 on the other face of this gear. Pins 40 successively engage a triangular extension 41 of rocker 31 whose arm is restrained by rubber band 35 and carries a ball hammer 42 by way of a spring 43, the hammer being positioned to strike gong 29.

Thus in operation after the hour gong 28 is struck to sound the hour, gong 29 is thereafter struck three times in succession to sound the quarter-hours before the hour gong 28 is again struck. In this way, as the crank is turned, the child sees the gears in motion, he sees the time hands turn, with the minutes being ticked off, and a gong sound announcing each quarter-hour interval and a different and deeper gong sound announcing each hour.

All the gears are transparent, although they may have different colors, so that while the minute wheel 18 lies behind the hour wheel 20, it may be seen through the hour wheel. Hence even though many of the gears are in overlapping relationship, their movements are visible to the child as he cranks the clockworks. Thus the child is able to understand the measurement of time in terms of a direct experience under his control, for the child functions as the motor of the clockworks, and the results of his activity in terms of increments of time, are clearly evident visually and aurally.

Moreover, with overlapping gears of different color, because the gears are transparent they act as light filters whose colors combine additively to produce still other colors in the region of overlap. For example, red and green gears combine to produce an orange color, thereby enhancing the decorative effect of the gear works.

While there has been shown and described a preferred embodiment of time tone clock in accordance with the invention, it will be appreciated that many changes and modifications may be made therein without, however, departing from the essential spirit of the invention as defined in the annexed claims.

What I claim is:

1. A device adapted to teach how to tell time, said device comprising:
   (a) a casing having front and rear transparent windows, said front window having a circular dial thereon graduated in minute and hourly increments,
   (b) a gearworks within the casing in a position to be viewed through said windows, said works being formed of transparent elements and including a minute wheel and an hour wheel, whereby light may pass through said windows and through said elements,
   (c) a manually-operated crank mounted on said casing and operatively coupled to said gearworks to cause said minute wheel to make a full revolution for each thirty degrees of movement of the hour wheel,
   (d) hour and minute hands mounted over said window to coperate with said dial and coupled to said hour and minute wheels to rotate therewith, and
   (e) first and second means each operatively coupled to said gearworks to produce distinctive sounds, said first means producing sounds when the minute hand passes the minute increments on said dial, and said second means producing sounds when the hour hand passes the hour increments thereon.

2. A device as set forth in claim 1, wherein said first means includes a gear coupled to said minute wheel and having a series of pins circumferentially arranged thereon to engage a reed to produce a ticking sound for each minute of movement.

3. A device as set forth in claim 1, wherein said second means includes a gear coupled to said minute wheel and having a first series of pins on one face thereof and a second series of pins on the other face thereof, one series engaging a rocker to actuate a gong once an hour, and the other series engaging a rocker to actuate a gong once every fifteen minutes between the hours.

References Cited

UNITED STATES PATENTS

| 1,537,390 | 5/1925 | Vincent | 58—2 |
| 1,977,457 | 10/1934 | Smith | 46—39 X |
| 2,146,711 | 2/1939 | Claves | 58—8 |
| 2,692,443 | 10/1954 | Milligan | 35—13 |
| 3,002,335 | 10/1961 | Kripak | 35—13 X |
| 3,247,614 | 4/1966 | Spengler | 46—177 |
| 2,919,538 | 1/1960 | Eichholz | 58—106 |

FOREIGN PATENTS

| 1,049,988 | 8/1953 | France. | |

EUGENE R. CAPOZIO, Primary Examiner

W. H. GRIEB, Assistant Examiner

U.S. Cl. X.R.

46—177; 58—106